US008717174B2

(12) United States Patent
Gemer

(10) Patent No.: US 8,717,174 B2
(45) Date of Patent: May 6, 2014

(54) MONITORING APPARATUS FOR A TAG HAVING AN ENGAGED AND A NON-ENGAGED MODE

(75) Inventor: Gil Gemer, Nirit (IL)

(73) Assignee: 3M Innovative Properties Company, St. Paul, MN (US)

( * ) Notice: Subject to any disclaimer, the term of this patent is extended or adjusted under 35 U.S.C. 154(b) by 231 days.

(21) Appl. No.: 12/876,255

(22) Filed: Sep. 7, 2010

(65) Prior Publication Data

US 2012/0056744 A1 Mar. 8, 2012

(51) Int. Cl.
*G08B 21/00* (2006.01)

(52) U.S. Cl.
USPC .................. 340/572.1; 340/10.1; 340/539.13; 455/456.1

(58) Field of Classification Search
USPC ........ 340/539.13, 539.23, 568.1, 572.1, 10.1; 455/456.1
See application file for complete search history.

(56) References Cited

U.S. PATENT DOCUMENTS

| | | | |
|---|---|---|---|
| 3,478,344 | A | 11/1969 | Shwitzgebel et al. |
| 3,506,791 | A | 4/1970 | Halaby |
| 4,593,273 | A | 6/1986 | Narcisse |
| 4,611,198 | A | 9/1986 | Levinson |
| 4,885,571 | A | 12/1989 | Pauley et al. |
| 4,918,432 | A | 4/1990 | Pauley et al. |
| 5,218,344 | A | 6/1993 | Ricketts |
| 5,255,306 | A | 10/1993 | Melton et al. |
| 5,426,425 | A | 6/1995 | Conrad et al. |
| 5,596,313 | A | 1/1997 | Berglund et al. |
| 5,659,303 | A | 8/1997 | Adair, Jr. |
| 5,796,827 | A | 8/1998 | Coppersmith et al. |
| 5,831,535 | A | 11/1998 | Reisman et al. |
| 5,867,103 | A | 2/1999 | Taylor, Jr. |
| 5,889,474 | A | 3/1999 | LaDue |
| 5,892,441 | A | 4/1999 | Woolley et al. |
| 5,936,529 | A | 8/1999 | Reisman et al. |
| 6,222,440 | B1 | 4/2001 | Heller |
| 6,232,916 | B1 | 5/2001 | Grillo et al. |
| 6,373,389 | B1 | 4/2002 | Przygoda, Jr. et al. |
| 6,396,413 | B2 | 5/2002 | Hines et al. |
| 6,492,906 | B1 * | 12/2002 | Richards et al. ........... 340/573.4 |
| 6,774,797 | B2 | 8/2004 | Freathy et al. |
| 6,844,816 | B1 | 1/2005 | Melton et al. |
| 6,934,571 | B2 | 8/2005 | Wiesmann et al. |
| 6,992,582 | B2 | 1/2006 | Hill et al. |
| 6,998,985 | B2 | 2/2006 | Reisman et al. |
| 7,023,356 | B2 | 4/2006 | Burkhardt et al. |
| 7,050,906 | B2 * | 5/2006 | Hathiram et al. ............. 701/517 |

(Continued)

FOREIGN PATENT DOCUMENTS

| | | |
|---|---|---|
| EP | 0902401 | 5/2003 |
| EP | 0905656 | 2/2004 |

(Continued)

*Primary Examiner* — Jeffrey Hofsass

(57) ABSTRACT

An apparatus and method for bi-directional communication with an external transceiver; the apparatus comprising a transmitter for transmitting an engagement request message from a tag to said external transceiver when said tag is in a non-engaged mode and for transmitting a directed message from said tag to an engaged external transceiver when said tag is in an engaged mode; a processor for bi-directional communication and for changing said engaged mode of said tag to the non-engaged mode, following a lost connection with said engaged external transceiver; and a receiver for receiving a response for said engagement request message from said external transceiver and for receiving an acknowledgement message to said directed message from said engaged external transceiver.

17 Claims, 4 Drawing Sheets

(56) References Cited

U.S. PATENT DOCUMENTS

| | | |
|---|---|---|
| 7,075,411 B2 * | 7/2006 | Kelly et al. ............ 340/10.1 |
| 7,076,441 B2 | 7/2006 | Hind et al. |
| 7,317,377 B2 | 1/2008 | Galperin et al. |
| 7,545,318 B2 | 6/2009 | Derrick et al. |
| 2005/0068169 A1 * | 3/2005 | Copley et al. ......... 340/539.13 |
| 2006/0174129 A1 * | 8/2006 | Brignone et al. ........... 713/181 |

FOREIGN PATENT DOCUMENTS

| | | |
|---|---|---|
| GB | 2415072 | 12/2005 |
| IL | 125488 | 8/2002 |
| IL | 125487 | 3/2003 |
| IL | 162371 | 9/2010 |
| IT | 1352126 | 1/2009 |
| WO | 8906367 | 7/1989 |

* cited by examiner

MONITORING APPARATUS FOR A TAG HAVING AN ENGAGED AND A NON-ENGAGED MODE

BACKGROUND

The present invention generally relates to electronic monitoring systems. More specifically, the present invention relates to a transceiver tag in a monitoring system.

Electronic monitoring systems for remote monitoring and supervising of moving objects, and in particular for monitoring persons are employed in a variety of fields, including security, law enforcement, medical and more. A typical monitoring system comprises a plurality of portable transmitting devices associated with monitored persons or monitored objects. The portable transmitting devices are also known as "tags". Typical monitoring systems also include one or more fixed or mobile local monitoring units and a central monitoring station where the information received by the local monitoring units is collected and further processed.

When used for monitoring persons, in a house arrest environment, for example, the portable tag is usually strapped around a limb of the person being monitored and typically includes a sensor for sensing tampering with the tag. Tags periodically send signals, including the tag's identification code, to be received by an external receiver with which the tag is engaged, in a local monitoring unit. The signals may be processed and reported to the central monitoring station.

In some cases, the monitoring person is allowed to be in several locations. For example, the monitored person may be allowed to exit the house and go to his or her work place. In such cases, the portable tag may disengage from the receiver of the house arrest environment and may engage with a receiver that is close to or in the work place. In some cases, the tag may be temporary engaged with one or more receivers on the way to work. The engagement process may comprise authentication and may also comprise methods for initializing an encrypting process between the tag and the external receiver. There are efforts to minimize the portable tag. Such efforts entail the minimization of the battery of the tag so as to conserve on battery use.

SUMMARY

On exemplary embodiment of the disclosed subject matter is an apparatus for bi-directional communication with an external transceiver; the apparatus comprising a transmitter for transmitting an engagement request message from a tag to said external transceiver when said tag is in a non-engaged mode and for transmitting a directed message from said tag to an engaged external transceiver when said tag is in an engaged mode; a processor for bi-directional communication and for changing said engaged mode of said tag to the non-engaged mode, following a lost connection with said engaged external transceiver; and a receiver for receiving a response for said engagement request message from said external transceiver and for receiving an acknowledgement message to said directed message from said engaged external transceiver. The processor is further configured for engaging a mutual secured encryption key with said external transceiver. The acknowledgement message further comprising a first data. The engagement request message further comprising a second data. The directed message further comprising a third data.

Another exemplary embodiment of the disclosed subject matter is a method for bi-directional communication between a tag and an external transceiver, comprising transmitting an engagement request message from said tag to said external transceiver when said tag is in a non-engaged mode; changing said non-engaged mode of said tag to an engaged mode, as a result of receiving a response for said engagement request message from said external transceiver; when engaged, said external transceiver is an engaged external transceiver; transmitting a directed message from said tag to said engaged external transceiver when said tag is in the engaged mode; and changing said engaged mode of said tag to the non-engaged mode, as a result of a lost connection with said engaged external transceiver. The lost connection comprising not receiving an acknowledgement to said directed message from said engaged external transceiver. The transmitting said engagement request message is performed periodically. The transmitting said directed message is performed periodically. The method further comprising negotiation mutual secured encryption key with said engaged external transceiver. The method further comprising attaching said engaged mode to said engagement request message and to said directed message. The method further comprising attaching an identification number to said engagement request message and to said directed message for identifying said tag by a non-engaged transceiver. The identification number may be unencrypted. The method further comprising transmitting a broadcast engagement request message.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

Figure 4:
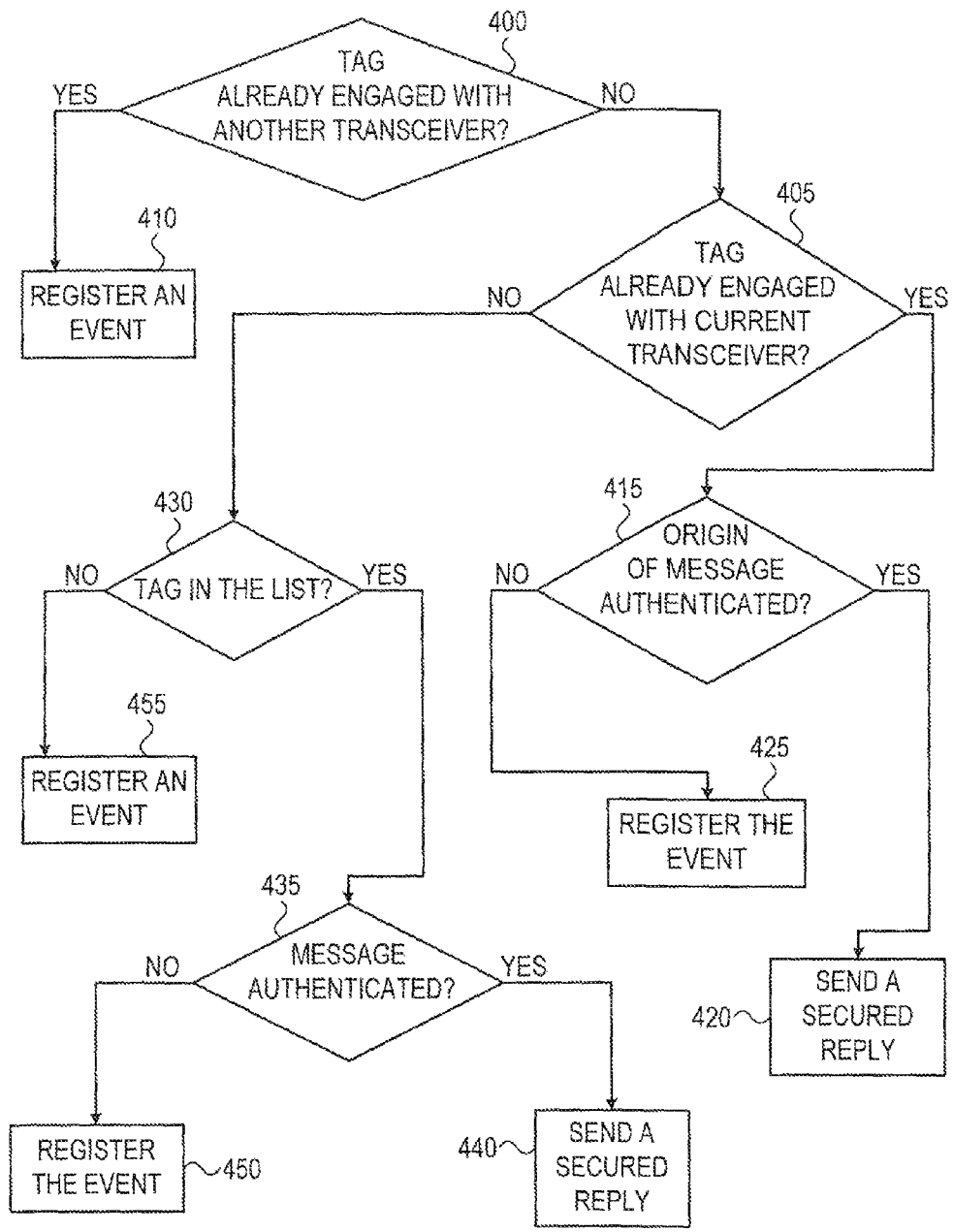

FIG. 4. shows the flowchart diagram of the transceiver, in accordance with some exemplary embodiments of the subject matter.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to minimize energy consumption of a tag. Such saving is important when minimizing the size of a tag and when using small batteries. Reducing the tag's power consumption enables the further miniaturization of tags and therefore making them cheaper, more prevalent and easier to wear and use.

Another technical problem dealt with by the disclosed subject matter is to avoid redundant computational load on a receiver, such as a receiver of a tag or receiving unit which is engaged with a tag; such a redundant load may affect the quality of the monitoring capabilities.

Another technical problem dealt with by the disclosed subject matter is to be capable to secure communication between a single tag and an external receiver wherein the tag may be engaged, in different periods, with a plurality of receivers and wherein the external receiver may be engaged with a plurality of tags.

One technical solution comprises avoiding unnecessary engagement activities between a tag and a receiver receiving transmissions from a tag. Such unnecessary engagement activities may drain the tag battery and may also cause a redundant computational load on the external receiver which may affect the quality of its monitoring capabilities. Such unnecessary engagement activities may occur when monitored persons, equipped with personal tags, are moving in an area comprising many home receivers. Avoiding unnecessary engagement activities may be done by using a non-encrypted indication of the status of the tag. Such an indication may identify whether the tag is currently coupled with another device, or whether the tag is free to establish a new engagement. Such an indication may be embedded in broadcast engagement requests that are sent by the tag. Such an indication may be used by the external receivers for avoiding engagement attempts with a tag that is already engaged. In some embodiments of the subject matter the encryption can be a hard coded AES-128 bit, AES-192 bit, AES-256 bit encryption or the like. To further alleviate the need for multiple unnecessary communications, the tag and receiver may be pre-hardcoded with an encryption certificate (public or private) which will reduce the need to exchange certificates during the handshaking phase of establishing communication. In other embodiments the encryption certificate is exchanged between the receiver and tag only once and every additional communication is performed with the said exchanged encryption certificate or certificates.

Yet another technical solution comprises changing the engagement status to not being engaged as a result of lost connection to with the engaged external receiver. Moving away from a coupled external receiver may cause the loss of communication with that external receiver. In such a case, changing the status of the tag to disengaged may enable an engagement with a nearby external receiver.

Yet another technical solution comprises providing transmitting capabilities to the external receiver for enabling the external receiver to function as an external transmitter. Such an external transmitter may acknowledge an engagement request. Such an external transmitter may also exchange an encryption key with the engaged tag for securing the communication with an engaged tag.

Another technical solution may also comprise the ability of the external transceiver to engage only with tags that are included in a pre-defined list of tags that may communicate with the external transceiver by comparing the tag identification number to a list of identification numbers.

One technical effect of utilizing the disclosed subject matter is the ability of an external transceiver to identify a tag that is already engaged with another external transceiver in order, for example, to display the presence of the transmitter to a monitoring person driving by with a mobile receiver unit.

Figure 1:
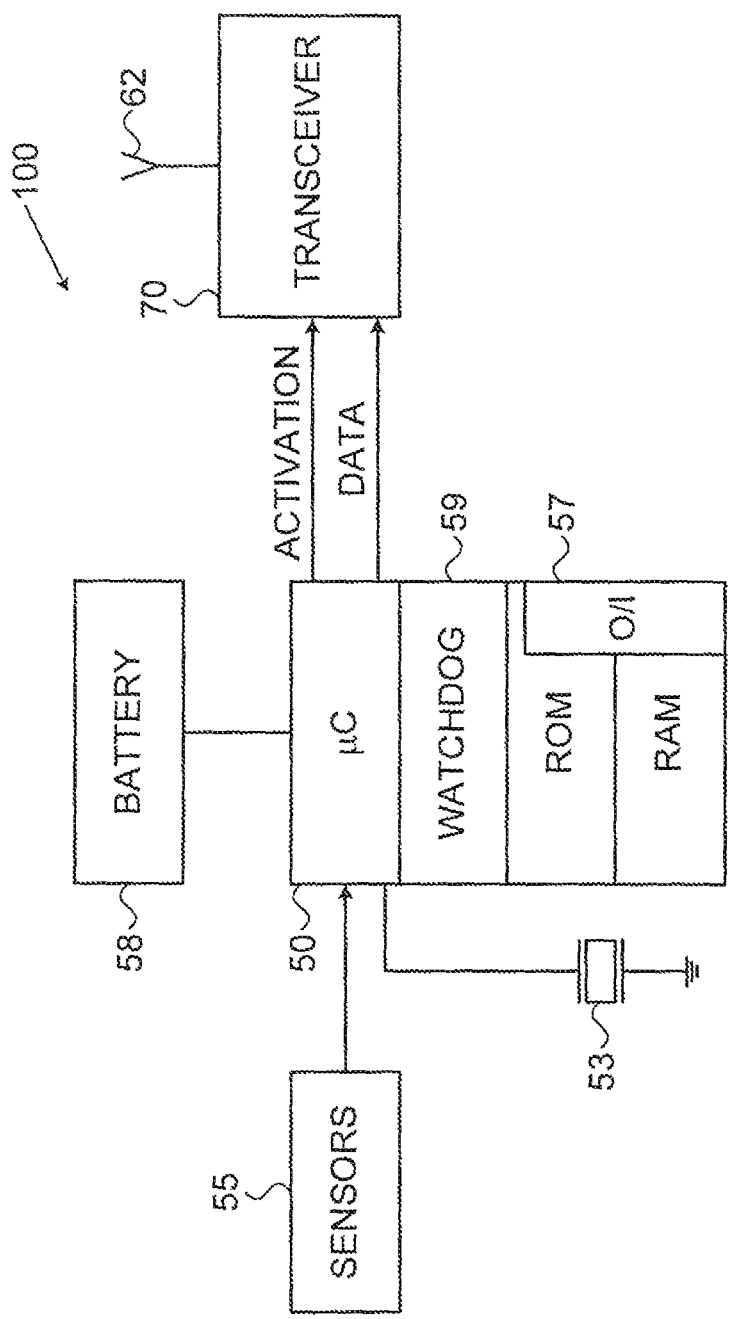
FIG. 1 shows a schematic view of a typical transceiver tag, in accordance with some exemplary embodiments of the subject matter.

FIG. 1 illustrates a block diagram of an electronic circuitry, typically enclosed within a housing of a transceiver tag in accordance with an exemplary embodiment of the disclosed subject matter. Electronic circuitry 100 comprises a microcontroller 50 for controlling the tag operation and for enabling a mutual engagement process with one or more external transceivers. The microcontroller 50 further enables the communication between engaged external transceivers and the transceiver tag.

The electronic circuitry 100 also comprises a transmitter 60 for to transmitting data signals to an external transceiver via an antenna 62. The electronic circuitry 100 also comprises a receiver 80 for receiving data signals from an external transceiver via the antenna 62 or via another antenna (not shown) for enabling bi-directional communication between the transceiver tag and the engaged external transceiver. The microcontroller 50 comprises a memory 57 for storing data such as operation program, engagement status and the tag identification code. The memory 57 may include non-volatile memory ROM or volatile memory RAM. A CPU clock 53, for example a 2 MHz crystal, may be coupled to the microcontroller 50.

The electronic circuitry 100 may also comprise a watchdog timer 59 for use with the microcontroller 50. The watchdog timer 59 serves as a wake-up controller for periodically initiating a new operation cycle at predetermined time intervals.

The electronic circuitry 100 may also comprise a sensing unit 55 for providing input data to the microcontroller 50 regarding tampering and other activities performed by the monitored person. The sensing unit 55 may comprise various sensors, such as open-closure sensor, body proximity sensor, motion sensor etc. The electronic circuitry 100 may be powered by a battery 58.

The Microcontroller 50 may be programmed to activate the sensing unit 55 to read at predetermined time intervals, to process the readings and to activate the transceiver 60 to transmit multiple signals at multiple time intervals and to activate the transceiver 60 to receive signals. In some embodiments of the subject matter the transceiver 60 can be replaced by a transmitter or a receiver or a combination thereof.

Figure 2:
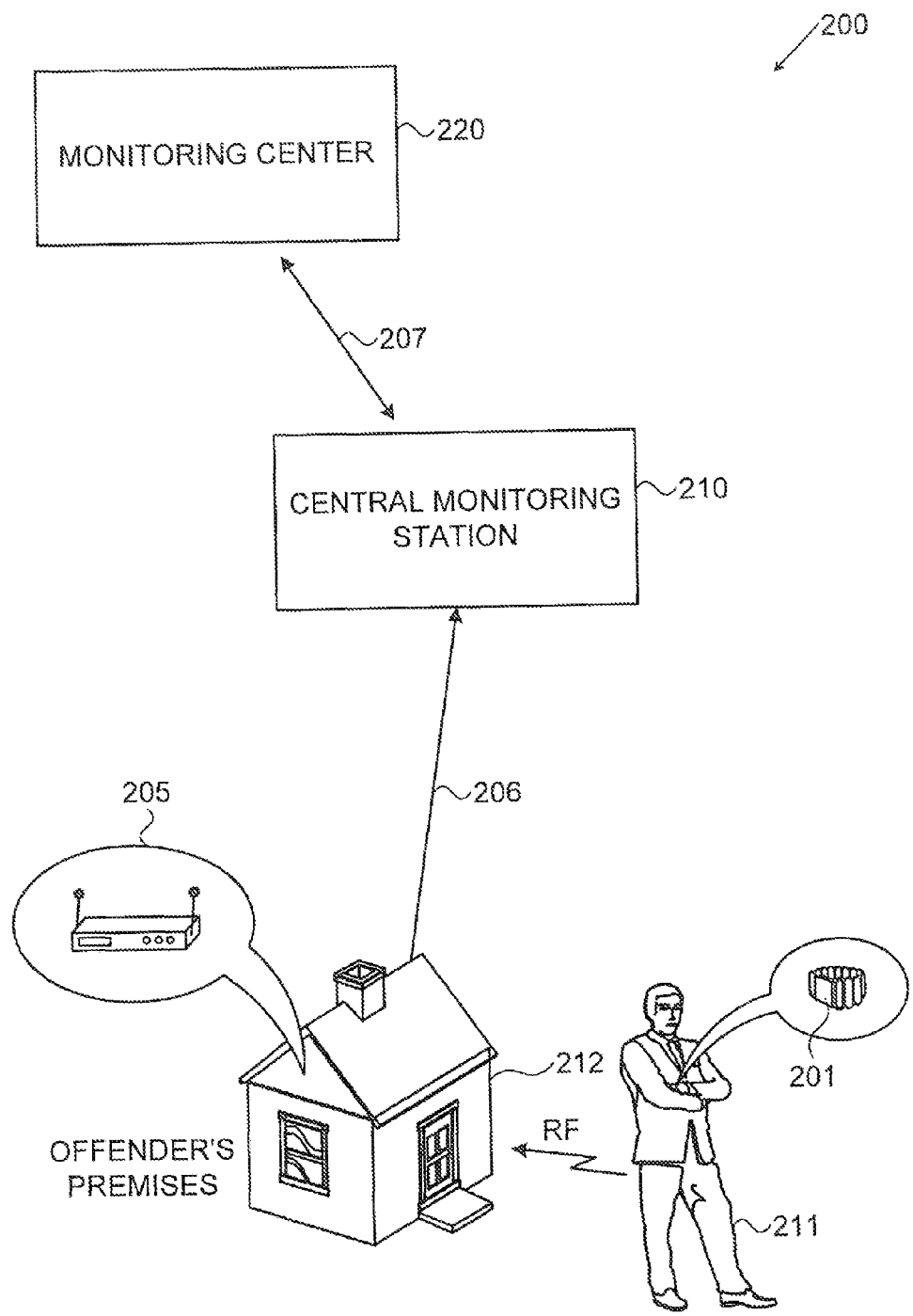
FIG. 2 shows an exemplary system comprising a tag, in accordance with some exemplary embodiments of the subject matter.

FIG. 2 shows an exemplary system wherein the disclosed subject matter may be practiced, in accordance with some exemplary embodiments of the subject matter. System 200 comprises a transceiver tag 201 enclosed on a person's 211 limb, such as the hand or leg. The transceiver tag 201 may transmit a status message to an to external transceiver 205 located at house 212 associated with the person 211. The external transceiver 205 may communicate with the central monitoring system 210 via cellular communication and/or via landline communication 206 for controlling and monitoring the person 211. Such controlling may comprise issuing an alarm to a monitoring center 220 when the person 211 enters or leaves an inclusion area which is covered by the external transceiver 205. The monitoring center 220 and the central monitoring system 210 may communicate via a wired or wireless connection 207.

Figure 3:
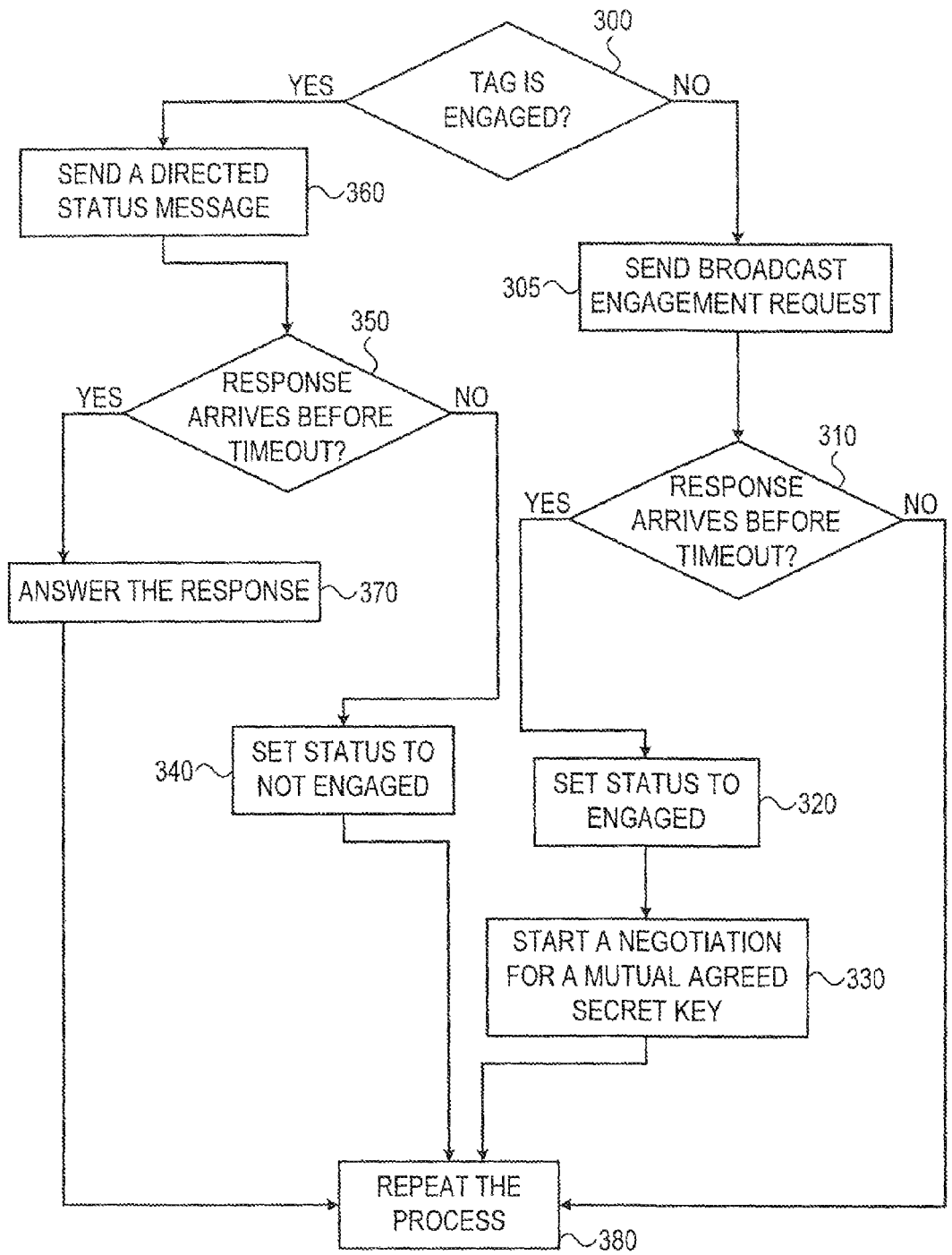
FIG. 3 shows a flowchart diagram of a method of engaging a tag with an external transceiver, in accordance with some exemplary embodiments of the subject matter.

FIG. 3 shows a method of engaging a tag with an external transceiver, in accordance with some exemplary embodiments of the subject matter. The tag may be initialized with a "not engaged" status.

In step 300, the status of the tag is checked. Steps 340, 350, 360 and 370 may be performed when the tag is already engaged.

In step 360, a directed status message is sent to the external transceiver with which the tag is engaged. The directed status message may comprise information regarding the sensors, identification number and the like. In one embodiment, a directed status message may comprise an indication that the tag is already engaged to a specific external transceiver. Such an indication enables a remote transceiver avoid an engagement process with tags that are already engaged. A portion of the direct message to a specific external transceiver may be encrypted as described in greater details in step 330. Such an encryption secures the communication by allowing only the engaged external transceiver to decrypt the message from the tag.

In step 350, the tag waits for a response from an external transceiver. The external transceiver may respond to a status message for enabling the tag to monitor the connection.

In step 340, which may be performed if a timely response has not arrived, the status of the tag may change to "non-engaged" for enabling the engagement with another external transceiver. The tag is capable of engaging with a second external transceiver unit when losing communication with an external transceiver with which transceiver tag is coupled. For example, when the transceiver tag is being worn on a person that moves from one location to another, the transceiver tag may be coupled with a first transceiver when being in the first place, and may be coupled with another transceiver when moving to the second place. Changing the status to "not engaged" may enable the tag to start an engagement process with another tag.

In step 370, the tag may reply to the response from the transceiver. For example, the response from the transceiver may comprise a request for information to which the tag may reply. The information may comprise strap status and battery status. The information may be encrypted with a secret key. The message may be sent with an authenticated signature.

Steps 305, 310, 320 and 330 may be performed if the tag is not engaged yet. In step 305, a broadcast engagement request may be sent.

In step 310, the tag waits for a timely response. If a timely response has arrived then, in step 320, the status of the tag may be changed to "engaged" and in step 330 the tag starts a negotiation for a mutual agreed secret key with the external transceiver by using methods known in the art such as RSA. The secret key may be used for securing the information exchanged with the engaged remote transceiver. The secret key negotiation process is a more secured method comparing to highly insecure methods known in the art such as burning the secret encryption key during the production process or downloading the secret key from the central monitoring system during the in-field activation process. The whole process may be repeated in step 380.

In one embodiment, an ID of the tag may be attached to messages sent by the tag to the external transceiver. The ID may be unencrypted. The ID may be used for enabling a remote transceiver which is not engaged with the tag for identifying the tag for various purposes. For example, a remote transceiver located in a mobile drive-by unit can receive and display the presence of the tag to a probation officer driving by with that mobile receiver unit.

FIG. 4 shows the flowchart diagram of the external transceiver upon receiving a message from a tag, in accordance with some exemplary embodiments of the subject matter. An external transceiver may be engaged with more than one tag. An external transceiver may receive messages from tags that are not engaged and/or are not configured to be engaged with the external transceiver. In such a case the external transceiver may ignore messages from a tag that is already engaged with another external transceiver and may only reply to an engagement request of the tag that is not engaged and is configured to be engaged with the external transceiver.

In step 400, the external transceiver may check in the received message if the tag is already engaged with another external transceiver.

In step 410, which may be performed if the tag is already engaged, the event may be registered. In some exemplary embodiment the identification of the tag may be kept in the transceiver for monitoring purposes.

Steps 405, 415, 420 and 425 may be performed if tag is not engaged with another external transceiver. In step 405, the external transceiver may check if this external transceiver and the tag are already engaged. In step 515 which may be performed if this external transceiver and the tag are already engaged the authentication of the message is verified.

In step 420, which may be performed if the message is authenticated, a secured reply may be sent to the tag.

In step 425, which may be performed if the message is not authenticated, the event may be registered for monitoring and controlling purposes.

Steps 430, 435, 440, 450 and 455 may be performed if the tag is not engaged with any external transceiver. In step 430 the external transceiver may check if the tag is included in a list of tags that are assigned to this external transceiver and with which the external transceiver is permitted to be engaged. Each external transceiver may comprise a list of tags with which the tag can engage.

Steps 435, 440 and 450 may be performed if tag is listed in the list. In step 435 the authentication of the message may be verified and the engagement process may be initiated.

In step 440, which may be performed if the message is authenticated, a response to an engagement request which may include an authentication signature may be sent to the tag.

In step 450, which may be performed if the message is not authenticated, the event may be registered.

In step 455 which may be performed if tag is not yet engaged with any external transceiver but is also not included in the list of tags with which the external transceiver is permitted to work, the event may be registered.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. An apparatus for bi-directional communication with an external transceiver; the apparatus comprising:
   a transmitter for transmitting an engagement request message from a tag to said external transceiver when said tag is in a non-engaged mode and for transmitting a directed message from said tag to an engaged external transceiver when said tag is in an engaged mode, the directed message and the engagement request including a status indicator indicating whether or not the tag is engaged with any external transceiver;
   a processor for bi-directional communication and for changing said engaged mode of said tag to the non-engaged mode, following a lost connection with said engaged external transceiver; and
   a receiver for receiving a response for said engagement request message from said external transceiver and for receiving an acknowledgement message to said directed message from said engaged external transceiver.

2. The apparatus of claim 1, wherein said processor is further configured for engaging a mutual secured encryption key with said external transceiver.

3. The apparatus of claim 1, wherein said acknowledgement message further comprises a first data.

4. The apparatus of claim 1, wherein said engagement request message further comprises a second data.

5. The apparatus of claim 1, wherein said directed message further comprises a third data.

6. A method for bi-directional communication between a tag and an external transceiver, comprising:
   transmitting an engagement request message from said tag to said external transceiver when said tag is in a non-engaged mode, said engagement request including a status indicator indicating that the tag is not engaged with any external transceiver;
   changing said non-engaged mode of said tag to an engaged mode, as a result of receiving a response to said engagement request message from said external transceiver; when engaged, said external transceiver is an engaged external transceiver;
   transmitting a directed message from said tag to said engaged external transceiver when said tag is in the engaged mode, the directed message including the status indicator indicating that the tag is engaged with the engaged external transceiver; and
   changing said engaged mode of said tag to the non-engaged mode, as a result of a lost connection with said engaged external transceiver.

7. The method of claim 6, wherein said lost connection comprises not receiving an acknowledgement to said directed message from said engaged external transceiver.

8. The method of claim 6, wherein said transmitting said engagement request message is performed periodically.

9. The method of claim 6, wherein said transmitting said directed message is performed periodically.

10. The method of claim 6, further comprising negotiating mutual secured encryption key with said engaged external transceiver.

11. The method of claim 6, further comprising attaching said engaged mode to said engagement request message and to said directed message.

12. The method of claim 6, further comprising attaching an identification number to said engagement request message and to said directed message for identifying said tag by a non-engaged transceiver.

13. The method of claim 12, wherein said identification number is unencrypted.

14. The method of claim 6, further comprising transmitting a broadcast engagement request message.

15. An apparatus for bi-directional communication with an external transceiver; the apparatus comprising:
   a transmitter for transmitting an engagement request message from a tag to said external transceiver when said tag is in a non-engaged mode and for transmitting a directed message from said tag to an engaged external transceiver when said tag is in an engaged mode, the directed message and the engagement request including a status indicator indicating whether or not the tag is engaged with any external transceiver;
   a processor for bi-directional communication and for changing said engaged mode of said tag to the non-engaged mode, following a lost connection with said engaged external transceiver; and
   a receiver for receiving a response for said engagement request message from said external transceiver and for receiving an acknowledgement message to said directed message from said engaged external transceiver,
   wherein the processor is further configured for engaging a mutual secured encryption key with said external transceiver, and wherein the status indicator is non-encrypted.

16. The apparatus of claim 12, wherein said engagement request and said directed message further comprise an identification number for identifying said tag by any external transceiver.

17. The apparatus of claim 16, wherein said identification number is unencrypted.

* * * * *

UNITED STATES PATENT AND TRADEMARK OFFICE
CERTIFICATE OF CORRECTION

| | |
|---|---|
| PATENT NO. | : 8,717,174 B2 |
| APPLICATION NO. | : 12/876255 |
| DATED | : May 6, 2014 |
| INVENTOR(S) | : Gemer |

Page 1 of 1

It is certified that error appears in the above-identified patent and that said Letters Patent is hereby corrected as shown below:

In the Specification

<u>Column 4</u>

Line 3, after "connection" delete "to".

<u>Column 4</u>

Line 35, after "for" delete "to".

<u>Column 5</u>

Line 3, after "to an" delete "to".

Signed and Sealed this
Third Day of February, 2015

Michelle K. Lee
*Deputy Director of the United States Patent and Trademark Office*